United States Patent

Waldman

[11] Patent Number: 4,791,260
[45] Date of Patent: Dec. 13, 1988

[54] INDUCTION TYPE ELECTRICAL WIRE PREHEATER

[75] Inventor: Myron Waldman, Pawtucket, R.I.

[73] Assignee: WST Power Electronics, Inc., Providence, R.I.

[21] Appl. No.: 103,684

[22] Filed: Oct. 2, 1987

[51] Int. Cl.[4] .............................................. H05B 6/44
[52] U.S. Cl. ...................... 219/10.61 R; 219/10.493; 219/10.71; 219/10.79
[58] Field of Search .................. 219/10.61 R, 10.61 A, 219/10.49 A, 10.71, 10.79, 10.43

[56] References Cited

U.S. PATENT DOCUMENTS

| | | | |
|---|---|---|---|
| 2,448,009 | 8/1948 | Baker | 219/10.79 X |
| 3,117,209 | 1/1964 | Peltier | 219/10.61 R |
| 3,176,111 | 3/1965 | Peltier | 219/10.61 R |
| 3,329,591 | 7/1967 | Müller et al. | 219/1061 R |
| 3,716,689 | 2/1973 | Meenen | 219/10.61 R |
| 4,221,947 | 9/1980 | Bonikowski et al. | 219/10.61 R X |
| 4,315,124 | 2/1982 | Granstrom et al. | 219/10.71 |
| 4,585,916 | 4/1986 | Rich | 219/10.61 R |

*Primary Examiner*—Philip H. Leung
*Attorney, Agent, or Firm*—Irving M. Kreigsman

[57] ABSTRACT

A preheater for heating either intermediate or small size electrical wire includes left and right inductors, each having a longitudinal passageway through which the wire to be heated is passed, one inductor being fixedly mounted on a mounting plate with its passageway vertical and the other inductor being pivotally mounted on the mounting plate so that its passageway can be either positioned vertically or tilted at an angle from vertical, a lower wheel rotatably mounted on the mounting plate below the inductors, a first upper wheel sized for use with intermediate diameter wires and a second upper wheel sized for use with small diameter wires, only one of the upper wheels being mounted on the mounting plate at a time. When intermediate size wire is being run, the pivotally mounted inductor is positioned with its passageway vertical and the first upper wheel is rotatably mounted on the mounting plate above the inductors and vertically aligned with the wheel. When small size wire is being run, the pivotally mounted inductor is tilted and the second upper wheel is rotatably mounted on the mounting plate above the inductors and aligned with the tilted inductor. In use, the wire being heated passes around the upper wheel, through one inductor, around the lower wheel, through the other inductor and then around the upper wheel again.

12 Claims, 4 Drawing Sheets

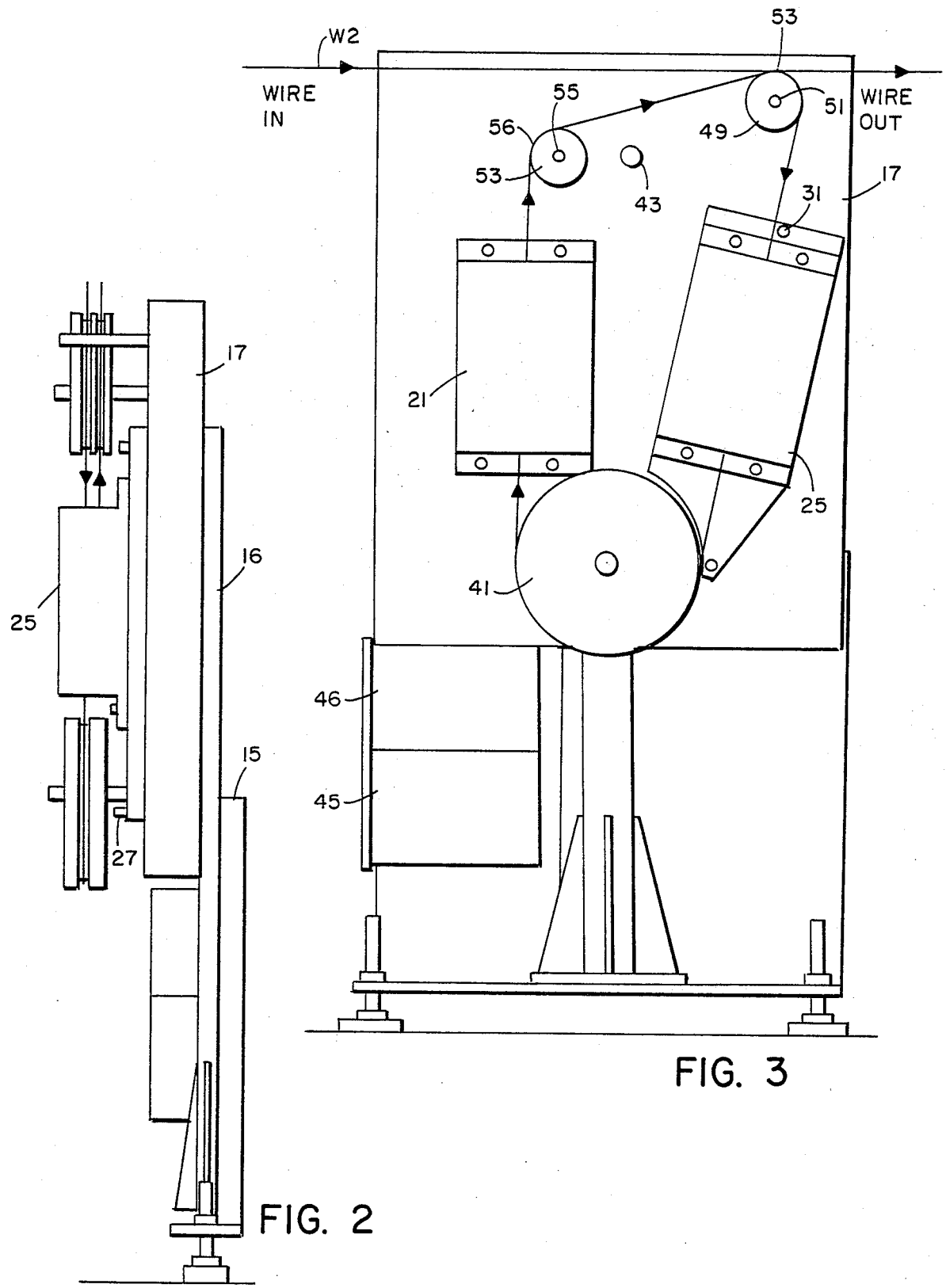

INDUCTION TYPE ELECTRICAL WIRE PREHEATER

BACKGROUND OF THE INVENTION

The present invention relates generally to induction type electrical wire preheaters and more particularly to an induction type electrical wire preheater which can be set up to handle intermediate diameter wires or set up to handle small diameter wires and which can be easily switched back and forth from one wire setup to the other to satisfy changing production requirements.

As used herein, the term "intermediate diameter wires" refers to wires having diameters between about 0.101 inches to about 0.032 inches and the term "small diameter wires" refers to wires having diameters between about 0.025 inches to about 0.01 inches.

Induction type wire preheaters are well known devices used extensively in the insulated wire manufacturing industry for preheating wire or cable which is being fed into an extrusion die. In such devices, the wire being heated acts as the moving secondary of a transformer and the primary voltage is used to control the wire temperature.

In U.S. Pat. No. 3,117,209 to W. L. Peltier there is disclosed an example of an induction type electric wire preheater. The preheater includes an upper wheel of predetermined size and made of conductive material, a lower wheel of the same size as the upper wheel and positioned below the upper wheel and an inductor (i.e. transformer), with the inductor being positioned between the two wheels. The inductor includes two vertical spaced apart insulated passageways, with the distance between the two passageways being equal to the diameter of the wheels. In use, the wire being heated enters the device from one side, passes over the upper wheel, down through one of the passageways in the inductor and under the lower wheel, up through the other passageway in the inductor, over the upper wheel again and then exits the device through the other side. Since the distance between the two passageways is fixed, the diameter of the upper wheel is also fixed. This is a limiting factor for production flexibility since the size of the upper wheel used with small sized wire is usually made much smaller than the size of upper wheel used with intermediate sized wire to minimize heat losses at the wheel itself.

One way that has been proposed in the past to avoid the problem associated with the need to use different sized upper wheels to accommodate different wire diameters is to provide two separate preheaters, each having its own uniquely sized upper wheel one preheater for use with intermediate sized wires and the other preheater for use with a smaller sized wires. As can be appreciated, this approach is economically undesirable.

In U.S. Pat. No. 3,176,111 there is shown an adapter which serves as a replacement for the upper wheel on the preheater shown in U.S. Pat. No. 3,117,209 when small size wire is being run. The adapter comprises a plate on which is rotatably mounted an upper wheel and an idler wheel, the upper wheel on the plate being sized smaller than the upper wheel which is being replaced. When the plate is mounted on the preheater in place of the normal upper wheel, the left edge of the idler wheel is vertically over the left passageway of the inductor and the right edge of the replacement upper wheel is vertically over the right passageway. Wire enters the preheater from the left and exits the preheater from the right. Although the attachment serves to reduce the heat loss in the upper wheel when small diameter wires are being run by using a smaller sized upper wheel and also by flattening the angle at which the wire contacts the upper wheel on leaving the inductor, it does not solve the problem of heat loss in the wire in air as it moves from the upper wheel to the extrusion die. The reason for this is that the distance from the wire contact area of the upper wheel on the attachment to the extrusion die is not appreciably less than the distance from the wire contact area of the upper wheel being replaced to the extrusion die. In both cases, the upper wheel is positioned to the left of the right passageway in the inductor. As is known, for small (i.e. fine) wire, the heat loss in air is extremely large. Consequently, any reduction in the distance the wire must travel from the upper wheel to the extrusion die will produce a reduction in this type of heat loss.

Accordingly, it is an object of this invention to provide a new and improved induction type electrical wire preheater.

It is another object of this invention to provide a preheater as described above which can be set up to handle intermediate size wire or set up to handle small size wire and which can be easily switched back and forth from one wire set up to the other to meet changing production requirements.

It is still another object of this invention to provide a preheater which is designed to handle two different sized upper wheels.

It is a further object of this invention to provide a preheater as described above which is designed specifically to reduce heat losses in air when handling small diameter wires.

It is still a further object of this invention to provide a preheater as described above which includes a new and novel type of inductor construction.

It is yet still a further object of this invention to provide a preheater as described above which is simple in construction and easy and economical to manufacture and assemble.

SUMMARY OF THE INVENTION

A preheater for use in heating electrical wire which can be set up to handle either intermediate size wire or small size wire constructed according to the teachings of the present invention includes in one embodiment a mounting plate, a pair of inductors mounted in side-by-side relationship on the mounting plate, each inductor having a longitudinal insulated passageway, a first upper wheel, said first upper wheel being sized for handling intermediate sized wire, a second upper wheel, said second upper wheel being sized for handling small sized wire, one of said upper wheels being mounted on the mounting plate, an idler wheel for use with the second upper wheel, a lower wheel and a power supply. One inductor is fixedly attached to the mounting plate with its passageway vertical. The other inductor is pivotally attached to the mounting plate such that its passageway can be positioned either vertically or tilted. The lower wheel is rotatably mounted on the plate below the inductors and the upper wheel, whichever one is being used, is rotatably mounted on the plate above the inductors, the position of the upper wheel on the mounting plate depending on whether it is the first upper wheel or the second upper wheel. If the second upper wheel is being used, the idler wheel is also mounted on the plate.

In use, the wire being heated enters the preheater from one side, passes over the upper wheel, down through the pivotally mounted inductor, under the lower wheel, up through the fixedly mounted inductor, over the upper wheel again or over the idler wheel and then over the upper wheel if the second upper wheel is being used and then exits the preheater from the other side.

When intermediate size wire is being heated, the pivotally attached inductor is angularly positioned with its passageway vertical and the first upper wheel is rotatably mounted above the inductors and vertically aligned with the lower wheel. In this arrangement, the idler wheel and the second upper wheel are not used.

When small size wire is being heated, the pivotally mounted inductor is angled from the vertical, the second upper wheel is rotatably mounted on the plate above the inductors and aligned with the pivoted inductor and the idler pulley is rotatably mounted on the plate above the inductors. In this arrangement, the first upper wheel is not used.

When the pivotally mounted inductor is tilted, the wire contact area of upper wheel is positioned closer to the side of the device that the wire exits from than when the pivotally mounted inductor is vertical. Consequently, the heat loss in air as the wire travels to the extrusion die is reduced.

In a modification of the invention, each one of the inductors is pivotally mounted on the mounting plate, the mounting plate itself is pivotally mounted on a supporting plate and the particular upper wheel being used is rotatably mounted on the mounting plate above the inductors.

Various features and advantages will appear from the description to follow. In the description, reference is made to the accompanying drawing which forms a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE INVENTION

In the drawings wherein like reference numerals represent like parts:

FIG. 1 is a simplified front elevation view, broken away in section in parts, of one embodiment of a preheater constructed according to the teachings of the present invention arranged for use in heating intermediate diameter wires, FIG. 2 is a side view of the preheater shown in FIG. 1, FIG. 3 is a simplified front elevation view of the preheater shown in FIG. 1, but arranged for use in heating small diameter wires.

FIG. 4 is a simplified front elevation view, broken away in section in parts, of a modification of the preheater shown in FIG. 1, arranged for use in heating intermediate diameter wires, and FIG. 5 is a simplified front elevation view of the embodiment of the preheater shown in FIG. 4, but arranged for heating small diameter wires.

DETAILED DESCRIPTION OF PREFERRED EMBODIMENTS

Figure 1:
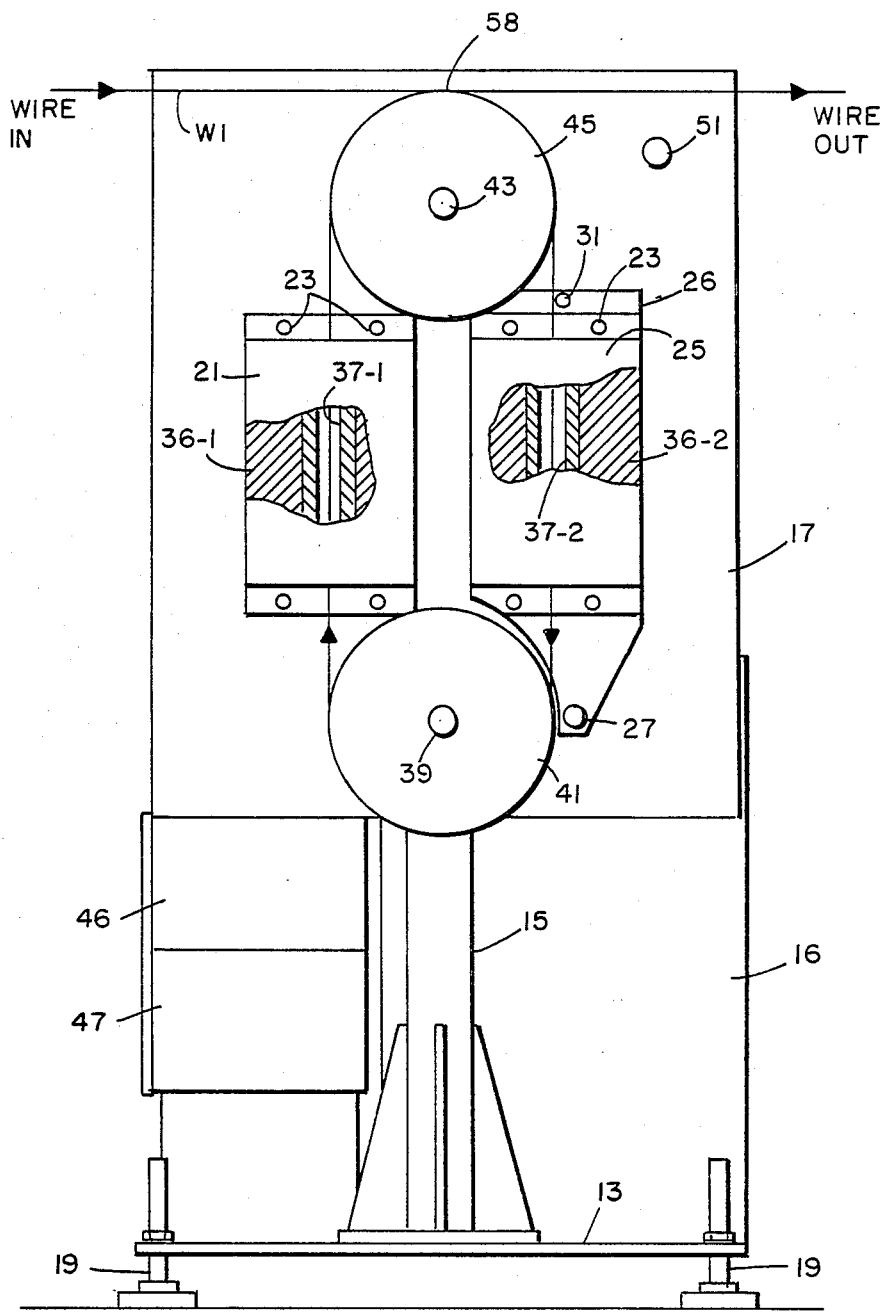

Referring now to the drawings, there is illustrated in FIGS. 1 through 3 an embodiment of a preheater constructed according to the teachings of the present invention. Portions of the preheater not pertinent to the invention are not shown. In FIGS. 1 and 2 the preheater is shown set up for handling intermediate diameter wires. In FIG. 3 the preheater is shown set up for handling small diameter wires.

Referring back to FIGS. 1 and 2, the preheater includes a base 13, a frame 15 fixed to base 13, a backplate 16 fixed to base 13 and a mounting plate 17 fixed to frame 15. Base 13 is supported on a plurality of adjustable mounting feet 19.

A first or left inductor 21 is fixedly mounted on plate 17 by a set of bolts 23. A second or right inductor 25, identical in construction to first inductor 21, is fixedly mounted by bolts 23 onto an intermediate plate 26 which is pivotally mounted on plate 17 by a pin 27 which is fixed to plate 17. A bolt 31 which screws through a hole in plate 26 and into either one of a pair suitably positioned threaded holes in plate 17 secures second inductor 25 in either a first or vertical position (as shown in FIG. 1) or a second or tilted position (as shown in FIG. 3). Since the preheater is set up for handling intermediate size wire in FIG. 1, inductor 25 is positioned vertically. Each one of the inductors 21, 25 includes a core, the cores being labelled 36-1 and 36-2, respectively. Each core 36-1, 36-2 has a longitudinal insulated passageway extending from the top to the bottom and through which the wire being heated is passed. The passageways being labelled 37-1 and 37-2, respectively. As can be seen in FIG. 1, inductor 21 is mounted on plate 17 with its passageway 37-1 vertical and inductor 25 is mounted on plate 17 so that its passageway 37-2 is also vertical.

A shaft 39 is fixedly mounted on plate 17 below inductors 21 and 25 and a lower wheel 41 is rotatably mounted on a shaft 39. A shaft 43 is fixedly mounted on plate 17 above inductors 21 and 25 and vertically aligned with shaft 39. A first upper wheel 45 which is made of conductive material is rotatably mounted on shaft 43. Upper wheel 45 is sized to accommodate intermediate size wire. Lower wheel 39 is the same size as upper wheel 43. The distance between the centers of passageways 37-1 and 37-2 is equal to the diameter of the two wheels 41 and 45 so that the wire being heated can pass through the passageways from one wheel to the other without touching the passageway sidewalls. Lower wheel 41 contains a single wire receiving groove while upper wheel 45 contains a pair of wire receiving grooves.

A power supply 46 supplies current to inductors 21 and 25 through a series, parallel switch 47. For simplicity the connections between switch 47, power supply 45 and inductors 21 and 25 are not shown.

When intermediate size wire is being run, as in FIG. 1, switch 47 is placed in a position such that current is applied to inductors 21 and 25 in parallel. When small size wire is being run, as will hereinafter be described in conjunction with FIG. 3, current is applied to inductors 21 and 25 in series.

Referring back to FIG. 1, the wire W1 to be heated, which is intermediate diameter in size, enters preheater horizontally from the left side near the top, passes over upper wheel 45 (in one of the grooves) and down through passageway 37-2 in second inductor 25, under lower wheel 41 and up through passageway 37-1 in first inductor 21, over upper wheel 45 again (in the other groove) and then exits the preheater horizontally from the right side near the top.

As is apparent, the path travelled by wire W1 in the preheater is similar to the path the wire travels in the preheater in U.S. Pat. No. 3,117,209.

When small diameter wires are to be run, the preheater is modified as shown in FIG. 3. First upper wheel 45 is removed and second inductor 25 is rotated to the right to its tilted position and secured in place by bolt 31. A second or replacement upper wheel 49 is rotatably mounted on a shaft 51 which is fixedly mounted on plate 17 and an idler wheel 53 is rotatably mounted on a shaft 55 which is also fixedly mounted on plate 17. Shaft 55 is mounted on plate 17 at a location such that the left edge 56 of wheel 53 is vertically above the center of the passageway 37-1 in left inductor 21. Wheel 49 is made of conductive material and has two grooves as is the case with wheel 45. However, wheel 49 is sized smaller than wheel 45 to accommodate small diameter wires. Idler wheel 53 is made of nonconductive material so as to absorb as little heat as possible from the wire being run. Shaft 51 is mounted on plate 17 at a location such that the top edge 53 of wheel 49 is considerably closer to the right or exit end of preheater 11 than the top edge 58 of wheel 45 as shown in FIG. 1. In particular, the top edge 58 of wheel 45 is aligned vertically with shaft 41 while top edge 53 of wheel 49 is aligned with the passageway 37-2 of inductor 25 when it is in the tilted position. Consequently, the distance the heated wire travels from wheel 49 to the extrusion die is less than the distance the wire travels from wheel 45 to the extrusion die. Thus, the heat loss in space will be less when wheel 49 is used and mounted as shown in FIG. 3.

In use, wire W2, which is small size wire, enters the preheater horizontally from the left, passes over wheel 49 and down through second inductor 25, under lower wheel 41 and up through first inductor 21, over idler wheel 53 and over second upper wheel 49 again and then exits the preheater horizontally from the right.

Figure 4:
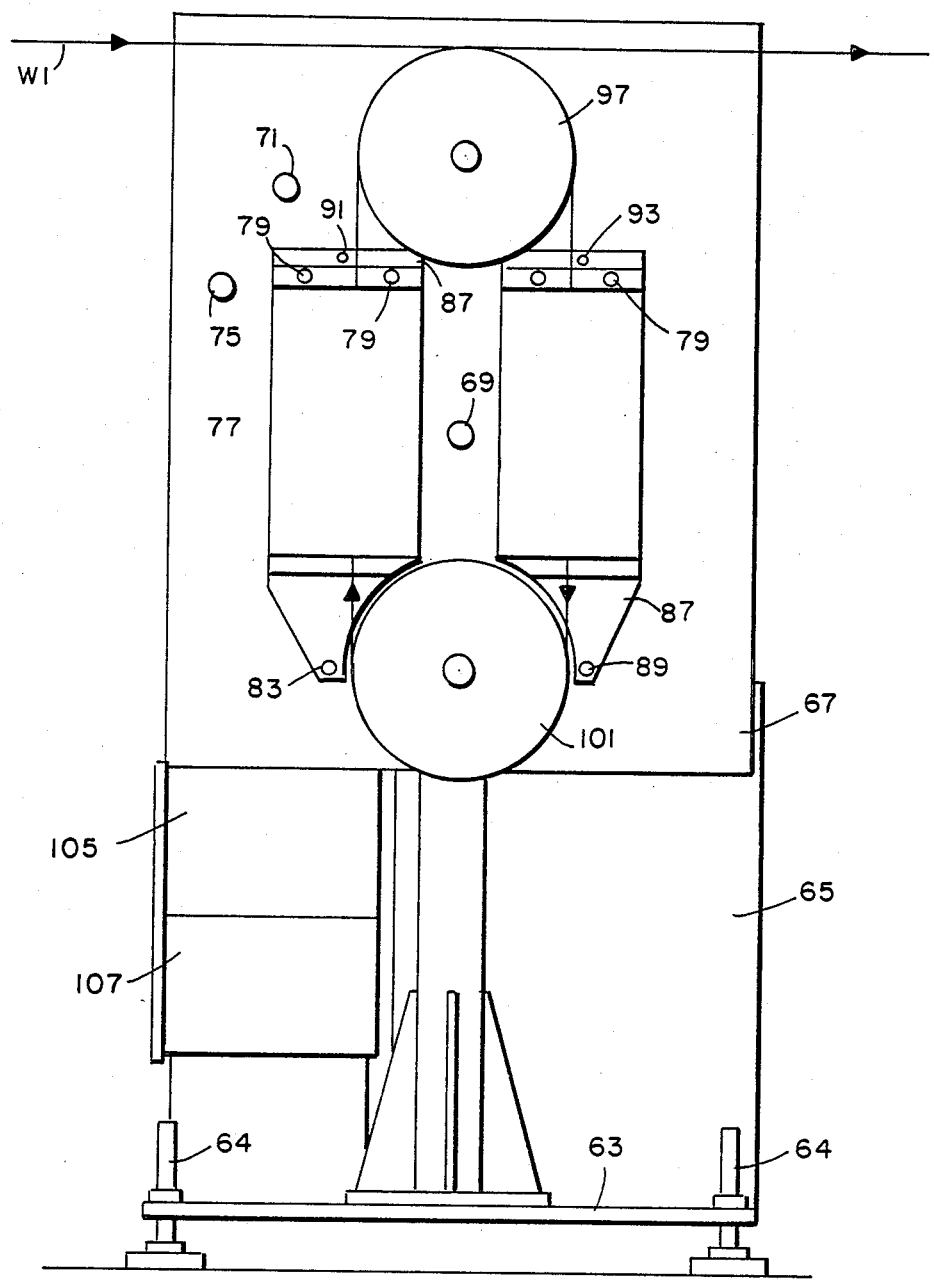
Figure 5:
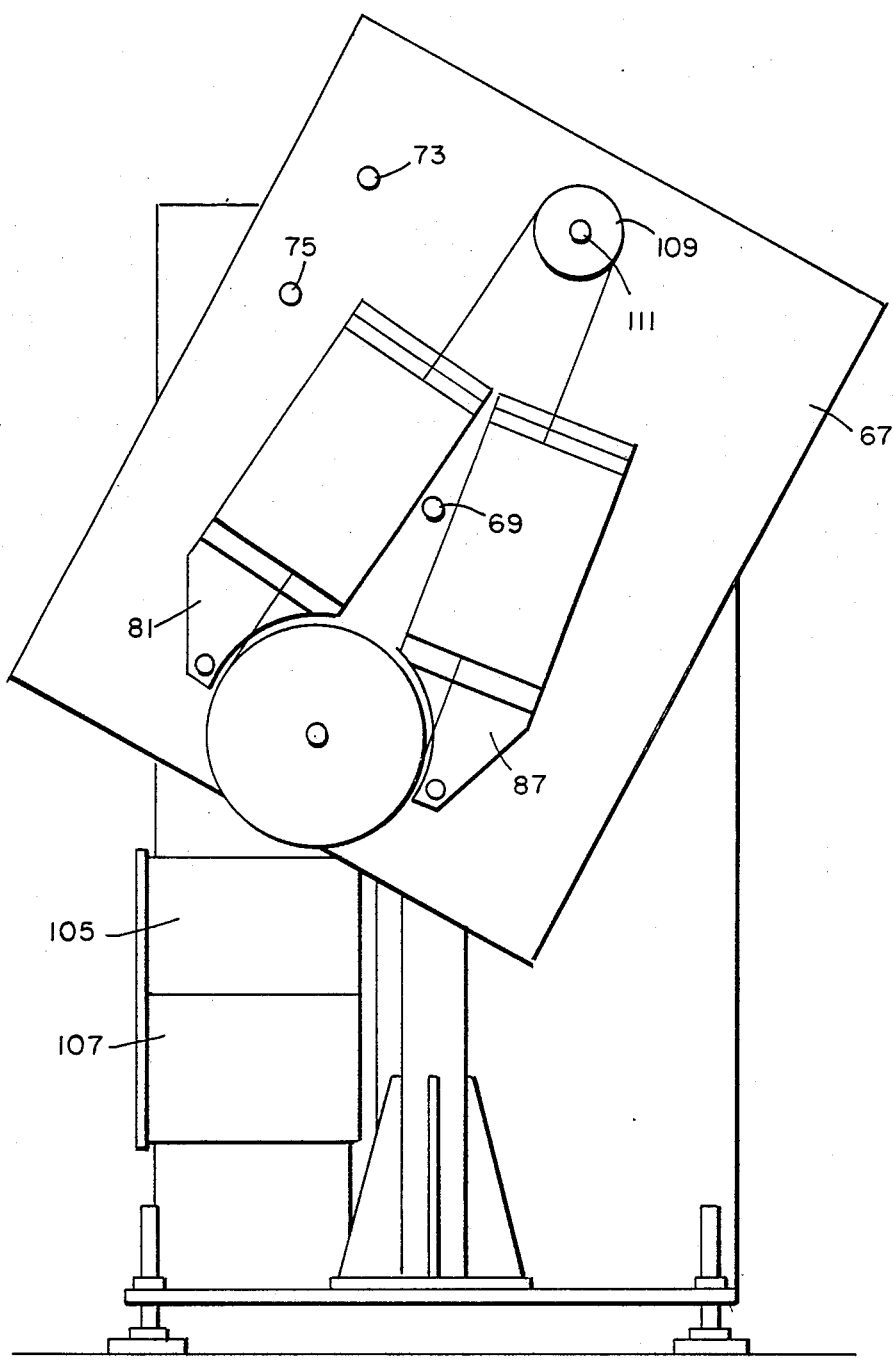

Referring now to FIGS. 4 and 5 there is illustrated another embodiment of a preheater constructed according to this invention. In FIG. 4, the preheater is shown set up for handling intermediate diameter wires, while in FIG. 5 the preheater is shown set up for handling small diameter wires.

Referring first to FIG. 4, the preheater includes a base 63 having adjustable mounting feet 64, a plate 65 fixedly mounted on base 63 and a plate 67 pivotally mounted through a pin 69 on plate 65. A bolt 71, which is insertable through either one of two mounting holes 73 and 75 and then into a threaded hole in plate 65 fixedly secures plate 67 to plate 65 in either a vertical position (as in FIG. 4) or a tilted position (as in FIG. 5).

A first inductor, 77 identical to inductor 21, is fixedly mounted by bolts 79 on an intermediate plate 81 which is pivotally mounted by a pin 83 on plate 67. A second inductor 85, which is identical to inductor 77, is fixedly mounted by bolts 79 on an intermediate plate 87 which is pivotally mounted by a pin 89 on plate 67. Bolts 91 and 93 secure inductors 77 and 85, respectively, on plate 67 either vertically as shown in FIG. 3 or tilted inward towards each other to form an inverted "V" as shown in FIG. 5.

An upper wheel 97, identical to wheel 45, is rotatably mounted on a shaft 99 which is fixedly mounted on plate 67 above the two inductors. A lower wheel 101 identical to wheel 41 is rotatably mounted on a shaft 103 which is fixedly mounted on plate 67 below inductors 77 and 85 and vertically aligned with shaft 99.

A power supply 105, similar to power supply 46, supplies current to inductors 77 and 85 through a switch 107, similar to switch 47.

In use, wire W1 to be heated enters preheater horizontally from the left, passes over upper wheel 97 and down through second inductor 85, under lower wheel 101 and up through first inductor 77, over upper wheel 97 again and then exits the preheater from the right.

When small diameter wire is to be run, the preheater is modified as in FIG. 5. More specifically, upper wheel 97 is removed and a second upper wheel 109, identical to second upper wheel 49, is rotatably mounted on a shaft 111 which is fixedly mounted on plate 67 vertically above shaft 99. Also, intermediate plates 81 and 87 are tilted inward so that the inductor passageways will be aligned with the wire as it travels between the two wheels. In addition, plate 67 is tilted to the right so that wheel 109 will be closer to the extrusion die.

The wire to be heated is fed through the components in the preheater as arranged in FIG. 5 in the same way as in the FIG. 4 arrangement.

Alternately, in the FIGS. 4 and 5 arrangements, the wire could enter from the right and exit from the left.

As can be appreciated, the preheater in FIG. 5 does not include an idler wheel.

It should be understood that the wire preheater of this invention is not limited to use solely with wire being fed into an extrusion die.

The embodiments of the present invention are intended to be merely exemplary and those skilled in the art shall be able to make numerous variations and modifications to it without departing from the spirit of the present invention. For example, in FIG. 3, inductor 25 could be made fixed, inductor 21 could be made pivotally mounted and the wire brought in from the right and made to exit from the left. In FIG. 1, the wire could be brought in from the right and made to exit from the left with no changes. All such variations and modifications are intended to be within the scope of the present invention as defined in the appended claims.

What is claimed is:

1. A preheater for heating electrical wire by induction comprising:
   a. a mounting plate,
   b. a first inductor mounted on said mounting plate,
   c. a second inductor mounted on said mounting plate,
   d. each inductor having a longitudinal insulated passageway,
   e. one of said inductors being pivotally mounted on said mounting plate,
   f. an upper wheel rotatably mounted on said mounting plate above said inductors,
   g. a lower wheel rotatably mounted on said mounting plate below said inductors,
   h. the size of the upper wheel depending on the size of the wire being heated, the angular position of the two inductors relative to each other depending on the size of the upper wheel, and
   i. means for supplying current to the inductors, j. said electrical wire entering the preheater, passing over the upper wheel, down through the passageway in one of the inductors and under the lower wheel, up through the passageway in the other inductor and again over the upper wheel and then exiting the preheater.

2. The preheater of claim 1 and wherein the other one of said inductors is fixedly mounted on the mounting plate with its insulated passageway vertical.

3. The preheater of claim 2 and further including means for securing said pivotally mounted inductor in either a first position wherein its passageway is oriented vertically or a second position wherein its passageway is tilted.

4. The preheater of claim 3 and wherein said upper wheel is sized to accommodate intermediate diameter wire and is the same size as the lower wheel and the pivotally mounted inductor is positioned vertically.

5. The preheater of claim 3 and wherein said upper wheel is sized to accommodate small diameter wire, is smaller in size than the lower wheel, the pivotally mounted inductor is at an angle and the preheater further includes an idler wheel which is mounted on the mounting plate.

6. The preheater of claim 3 and wherein the lower wheel includes one groove and the upper wheel includes two grooves.

7. The preheater of claim 6 and wherein the means for supplying current to the inductors includes a power supply and a switch connecting the power supply to the inductors.

8. The preheater of claim 7 and wherein the switch is a series, parallel type switch.

9. The preheater of claim 1 and wherein the other inductor is pivotally mounted on the mounting plate, the preheater includes a frame and the mounting plate is pivotally mounted on the frame.

10. A preheater for heating electrical wire in linear motion comprising:
   a. a mounting plate,
   b. first and second inductors mounted on said mounting plate in side-by-side relationship, each inductor having an insulated passageway through which the electrical wire to be heated is passed, said first inductor being fixedly mounted on said mounting plate with its insulated passageway vertical, said second inductor being pivotally mounted on said mounting plate so that it can be placed in either a first angular position wherein its insulated passageway is vertical or a second angular position wherein its insulated passageway is tilted,
   c. a lower wheel rotatably mounted on said mounting plate below said first and second inductors,
   d. a first upper wheel sized for handling intermediate sized wire and a second upper wheel sized smaller than the first upper wheel for handling small sized wire, the lower wheel being the same size as the first upper wheel, both upper wheels being formed of electrically conductive material, one of said upper wheels being rotatably mounted on said mounting plate, the position of the upper wheel on the mounting plate depending on whether it is the first upper wheel or the second upper wheel and the particular upper wheel mounted on the mounting plate depending on the size of the wire being heated,
   e. an idler wheel mounted on said mounting plate when said second upper wheel is mounted on mounting plate, and
   f. power supply means coupled to said first and second inductors for applying current thereto.

11. An electrical wire preheater for preheating electrical wire to be fed into an extruding die comprising:
   a. a base
   b. a frame fixedly mounted on said base,
   c. a mounting plate pivotally mounted on said frame,
   d. a pair of inductors each pivotally mounted on said mounting plate in spaced side by side relationship,
   e. a lower wheel rotatably mounted on said mounting plate below said inductor,
   f. an upper wheel rotatably mounted on said mounting plate above said inductor in vertical alignment with said lower grooved wheel, and
   g. a power source coupled to said inductors.

12. An induction wire preheater for heating electrical wire comprising:
   a. mounting means,
   b. a first inductor mounted on said mounting means,
   c. a second inductor mounted on said mounting means,
   d. each inductor having a longitudinal insulated passageway,
   e. one of said inductors being pivotally mounted on said mounting means,
   f. a first wheel rotatably mounted on said mounting means above said inductors,
   g. a second wheel rotatably mounted on said mounting means below said inductors, and
   h. means for supplying current to the inductors,
   i. said electrical wire being heated entering the preheater, passing around a first one of the wheels, through the passageway in one of the inductors and around the other one of the wheels, through the passageway in the other inductor, again around the first one of the wheels and then exiting the preheater.

* * * * *